(12) United States Patent
Dressler (10) Patent No.: US 7,306,189 B2
(45) Date of Patent: Dec. 11, 2007

(54) SYSTEM AND METHOD FOR AN AMBIENT ATMOSPHERE ION THRUSTER

(75) Inventor: Gordon A. Dressler, Manhattan Beach, CA (US)

(73) Assignee: Northrop Grumman Space & Mission Systems Corp., Redondo Beach, CA (US)

( * ) Notice: Subject to any disclaimer, the term of this patent is extended or adjusted under 35 U.S.C. 154(b) by 0 days.

(21) Appl. No.: 11/609,268

(22) Filed: Dec. 11, 2006

(65) Prior Publication Data

US 2007/0176050 A1    Aug. 2, 2007

Related U.S. Application Data

(62) Division of application No. 10/698,847, filed on Oct. 30, 2003.

(51) Int. Cl.
B64G 1/40 (2006.01)
(52) U.S. Cl. ................. 244/171.1; 60/202
(58) Field of Classification Search ............ 60/202, 60/203.1, 767, 768; 313/360, 361.1; 315/111.61; 244/171.5, 171.1, 158.4, 166, 158.6, 158.5
See application file for complete search history.

(56) References Cited

U.S. PATENT DOCUMENTS

| | | |
|---|---|---|
| 3,120,363 A | 2/1964 | Hagen |
| 3,130,945 A | 4/1964 | De Seversky |
| 6,304,040 B1 | 10/2001 | Cardwell et al. |
| 6,786,035 B2 | 9/2004 | Stickelmaier |

OTHER PUBLICATIONS

T.J. McGuire & R.J. Sedwick, "Aero-Assisted Orbital Transfer Vehicles Utilizing Atmosphere . . . " AIAA 2001-0840, 39th AIAA Aerospace Scienses Meeting and Exhibit Jan. 8-11, 2001.
T. Cummings et. al., "Microwave Power-Beaming Demonstration with 6 k-V Rectenna . . . ", AIAA 2003-4431, 39th AIAA/ASME/SAE/ASEE Joint Propulsion Conference & Exhibit Jul. 21-23, 2003.
G. Primeau, "Magnetoaerodynamic (MAD) Propulsion for Exploration of . . . " AIAA 98-3408, 34th AIAA/ASME/SAE/ASEE Joint Propulsion Conference & Exhibit, Jul. 13-15, 1998.

(Continued)

Primary Examiner—Timothy D. Collins
(74) Attorney, Agent, or Firm—LaRiviere, Grubman & Payne, LLP (57) ABSTRACT

A system and a method for an ambient atmosphere ion thruster having a pair of permeable electrical members for accelerating ambient atmosphere ions which enter the thruster due to a craft's relative velocity. Neutral ambient atmosphere molecules in the intake mass flux may also be ionized and subsequently accelerated by the pair of permeable electrical members. Acceleration of any entering mass comprises an exhaust mass flux which then produces a net thrust. Such net thrust is then vectored by configuring and orienting the thrusters for imparting axial and lateral accelerations as well as pitch, yaw, and roll controls. The present invention is operational in proximity to any celestial body having a sensible atmosphere during a portion of the free trajectory or during orbiting at altitude. Useful net thrust is thereby produced without need for carrying reaction mass onboard a spacecraft.

22 Claims, 4 Drawing Sheets

OTHER PUBLICATIONS

Marshall H. Kaplan, "Modern Spacecraft Dynamics & Control", p. 262, ISBN 0-471-45703-5, John Wiley & Sons, Inc. (1976).

http://en.wikepedia.org/wiki/Deep_Space_1.
http://www.astronautix.com/craft/deepace1.htm.
http://en.wikipedia.org/wiki/Electrostatic_ion_thruster.

SYSTEM AND METHOD FOR AN AMBIENT ATMOSPHERE ION THRUSTER

CROSS-REFERENCE TO RELATED DOCUMENTS

The present patent application is a Divisional of U.S. patent application Ser. No. 10/698,847 filed on Oct. 30, 2003. The prior application is incorporated herein in its entirety by reference.

TECHNICAL FIELD

The present invention relates to spacecraft dynamics and spacecraft control systems and methods. More particularly, the present invention relates to spacecraft propulsion and spacecraft control systems and methods. Even more particularly, the present invention relates to satellite propulsion and satellite control systems and methods.

BACKGROUND ART

Rocket thrusting in space environments (e.g., at altitudes greater than 200 km above Earth's surface) has presumed that a propellant must be carried on board as a reaction mass (i.e., a fuel source). Related art space vehicles are typically propelled by carrying a reaction mass, chemically reacting or heating, or applying kinetic energy to, the mass and subsequently expelling the reacted mass, thereby propelling (i.e., thrusting) the space vehicle. Such related art propulsion systems usually comprise a fuel or reaction mass source and an energy source, which may be a chemical source, a photovoltaic source, a nuclear source, and/or a solar-thermal source.

Many spacecraft, specifically orbiting satellites operating in the near-Earth space environment (herein defined only for the purpose of discussion as being in the altitude range of 200 km to 1000 km above Earth's mean surface), require propulsion system operation to either maintain or adjust the spacecraft's altitude, the altitude and the velocity being affected by the presence of drag from residual atmospheric constituents. For example, the International Space Station ("ISS") currently requires frequent propulsive reboosting that necessitates refueling with propellants. Orbital decay, due to atmospheric drag, presents a major life-limiting issue for satellites, especially for reconnaissance and remote sensing satellites, which cannot be feasibly refueled to replenish propellants expended during propulsive reboosting.

Further, a need exists for surveillance satellites to maintain a lower Earth orbit in order to improve resolution of optical imaging, radar imaging, and infrared imaging. Such lower Earth orbit inherently involves greater atmospheric drag. The related art counters atmospheric drag by either accepting the situation and allowing for normal orbital decay before reentry (i.e., a satellite design life of less than about five years) or by carrying on-board propellant to maintain orbital altitude and to thereby extend operating life. Other related art space propulsion systems have employed gravitational gradients and geomagnetic fields for attitude stabilization; however, these methods do not provide the net thrust that is necessary for altitude control.

Figure 1:
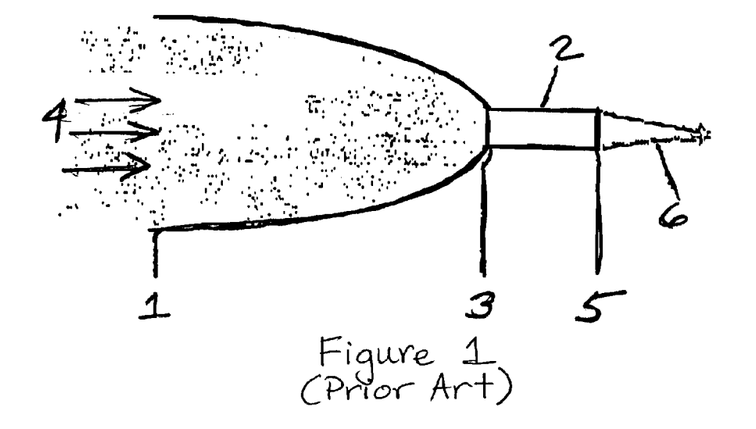
FIG. 1 is a cross-sectional view of an aero-assisted orbital transfer vehicle utilizing atmosphere ingestion comprising a scoop (a parabolic intake "nozzle"); and an engine, in accordance with the prior art.

Yet other related art space propulsion systems have proposed a "scooped" electric thruster in conjunction with a decreased on-board propellant load (i.e., the "aero-assisted" orbital transfer vehicle utilizing atmosphere ingestion, referring to prior art FIG. 1). Such scooped electric thrusters comprise a "scoop" (a large parabolic intake nozzle) 1 and an engine 2 having an inlet 3 for receiving the intake mass flow 4 and an outlet 5 for expelling the exhaust mass flow 6 (prior art FIG. 1). The scoop is required to compress the intake mass flow 4 and to direct it into the engine where it would be electrically heated or ionized and electromagnetically accelerated. Such scoops have been known to impart considerable drag, because they decelerate the intake mass flow 4. In order for such scoops to become operational, they must be light, deployable, and power-conservative. Inflatable structures and magnetic nozzles have been proposed to realize the development of a working scoop. Significantly, the scoop art does not suggest eliminating the scoop structure, eliminating the need for compressing the intake mass flow 4, nor using an ambient gas ionization level "as is" and without additional ionization of ambient neutral species.

"Ionic breeze" air purifiers use electric devices for moving ambient air; however, such devices are not known to have been applied to space propulsion systems nor has their use been suggested for use in the sparse atmosphere of the near-Earth space environment. Toy devices, known as "lifters," use a tethered ion breeze device for lifting a light frame from the ground. Lifters have not been found to be practical for any significant transportation purpose, because they require substantially high voltage (e.g., >15 kV) for operation. Moreover, the ionic breeze devices being implemented in air purifiers, as well as toy lifters, rely on the relatively dense atmosphere found near Earth's surface; and they have not been suggested nor demonstrated for operation in the sparse atmosphere of the near-Earth space environment (i.e., in the altitude range of at least 200 km above Earth's mean surface). Although some recent experimental work has been performed using ion breeze engines for endo-atmospheric ion propulsion, such work has been shown to require a magneto-hydrodynamic slipstream acceleration for hypersonic flight to at least orbital velocities at the top of the atmosphere.

While photon reflection has been also used as a "massless" method for providing thrust (e.g., solar sails and laser levitation of particles), such thrust has been demonstrated as being extremely low, and any thrust vectoring as being limited to a 180° arc centered on the vector of incident radiation.

Therefore, a long-felt need remains for a system and a method which provide useful drag compensation, useful thrust, useful torque, and useful attitude control for a space or an aerospace vehicle, regardless of size, while eliminating the expenditure of any reaction mass being carried on board the craft for these purposes.

DISCLOSURE OF THE INVENTION

The present invention involves a system and a method for an ambient atmosphere ion thruster ("AAIT") that provide useful drag compensation, useful thrust, useful torque, and useful attitude control for a spacecraft or an aerospace vehicle ("craft"), regardless of size, while eliminating the expenditure of any reaction mass being carried on board the craft for these purposes. The present invention comprises at least one ambient atmosphere ion thruster using only ambient atmospheric constituents (e.g., He, $N_2$, $N^+$, O, and $O^+$) for its reaction mass in the near-Earth space environment, thereby necessitating only enough electrical power consumption for orbit drag compensation ("make-up"), boosting/deboosting, orbit ephemeris maintenance, and/or craft attitude and control. In essence, the present invention comprises the electromagnetic acceleration of only ambient atmosphere constituents for propulsion and attitude control, with specific recognition that the fraction of constituents naturally existing in an ionized state may be sufficient for effecting the purpose of the present invention in some cases. More specifically, the present invention does not utilize any scoop device nor any other device for compressing the intake mass flow (i.e., the incoming intercepted ambient atmosphere gas flux).

The at least one ambient atmosphere ion thruster may comprise at least one pair of permeable electrical members for accelerating ambient atmosphere ions which enter the at least one thruster due to the craft's relative velocity. Neutral ambient atmosphere molecules may be further intercepted and ionized by the present invention and then subsequently accelerated by the at least one pair of permeable electrical members. Acceleration of any entering mass comprises a mass flux which then produces a net thrust. Such net thrust is then vectored by configuring and orienting the present invention thruster(s), being mounted either inboard or outboard the craft, for imparting axial and lateral accelerations as well as pitch, yaw, and roll ("P/Y/R") torques to the craft.

The two permeable electrical members (a forward member and a complementary aft member) of each at least one pair of permeable electrical members are separated by a distance and disposed at a parallel or an approximately parallel orientation for intercepting any ambient atmosphere ions, atoms, and molecules between the forward member and the aft member from the vicinity of the craft. The two members of each at least one pair of permeable electrical members are electrically charged with respect to one another (i.e., one is positively charged while the other is negatively charged) for accelerating the ions by the therebetween developed electrostatic field. The at least one pair of permeable electrical members may be mechanically connected by at least one electrically insulating support structure to the craft. The at least one electrically insulating support structure may have at least one electrical feed. Each member of the at least one pair of permeable electrical members comprises a high ratio of orifice area to lattice area for maximizing the mass flux throughput. The craft experiences a reactionary force from the accelerated ions, thereby providing a significant net thrust and/or torque for propelling the craft as well as for controlling the attitude of the craft.

The at least one pair of permeable electrical members and any ancillary equipment may further comprise a configuration and a voltage for ionizing uncharged particles (atoms or molecules) intercepted between the members of each at least one pair of permeable electrical members in order to supply reaction material beyond that provided by the ion density of the medium through which the craft is passing. The present invention also comprises an electrical power source for charging the at least one pair of permeable electrical members and for sustaining acceleration of the ions as well as any further ionization of the intercepted mass flux, wherein the electrical power source is provided for a duration imparting a desired reactive thrust and/or torque. The overall electrical circuitry and supporting ancillary equipment are configured to avoid any excessive electrical charging of the craft during operation by a technique such as using an electron gun for neutralizing the ion flux exiting the aft permeable electrical member of the at least one pair of permeable electrical members. The present invention may further comprise a thrust reverser achieved by reversing the relative polarity of each member of the at least one pair of permeable electrical members. Reversing the relative polarity of each member of the at least one pair of permeable electrical members may comprise reversing the polarity of the terminals of the electrical power source. Reversing the polarity of the terminals of the electrical power source may comprise mechanically actuating the electrical power source. The present invention may further comprise at least one gimbal for the at least one pair of permeable electrical members and the ancillary equipment for further attitude control.

Advantages of the present invention include, but are not limited to, significant performance, cost, reliability, and safety benefits by reducing or eliminating on-board propellants and any associated handling/support hardware and software from the craft, development of more thrust per unit weight, development of thrust in any direction with respect to the craft, operation in close proximity to any celestial body having a sensible atmosphere (e.g., Mars, Venus, Jupiter, Saturn, and Europa), and operation in the absence of sunlight. As such, new low Earth orbit ("LEO") missions (i.e., orbits having an altitude in a range of less than approximately 1000 km, geosynchronous transfer orbit ("GTO") missions, and planetary missions) maybe enabled by the present invention. Many satellite missions, such as reconnaissance missions, Earth resource mapping, space-based missile defense, atmospheric research, and ionospheric research, may be improved by maintaining a continuous lower Earth orbit which is provided by the present invention.

Additional advantages may be obtained by employing at least one AAIT on a craft for providing thrust and/or torque in any desired direction. Such additional advantages include, but are not limited to, alignment of thrust with the velocity vector intersecting or nearly intersecting the craft center of mass for providing a boost propulsive force, alignment of thrust opposing the velocity vector and intersecting or nearly intersecting the craft center of mass for providing a deboost propulsive force (thrust reverser), alignment of thrust in a direction normal to the velocity vector and intersecting or nearly intersecting the craft center of mass for providing resolved force components effecting a lateral thrust, and alignment of thrust in a direction of any of the three principle axes without intersecting nor nearly intersecting the craft center of mass for providing resolved force components effecting a pitch torque, a yaw torque, and/or a roll torque. Other features of the present invention are disclosed, or are apparent in the section entitled "Detailed Description of the Invention," disclosed, infra.

BRIEF DESCRIPTION OF THE DRAWING(S)

For a better understanding of the present invention, reference is made to the below referenced accompanying Drawing(s). Reference numbers refer to the same or equivalent parts of the present invention throughout the several figures of the Drawing(s).

FIG. 11 is an operational flowchart of an AAIT system, further comprising subsystems such as at least one optional auxiliary ionizing device selected from a group consisting essentially of an electron bombardment ionizer, a radio frequency ionizer, a microwave ionizer, an extreme ultraviolet ionizer, a flash lamp ionizer, and a magnetic field ionizer for ionizing any un-ionized constituents in the ambient atmosphere; at least one optional electromagnetic field modifying device selected from a group consisting essentially of an electron gun, a permanent magnet, and an electromagnetic field projector for modifying the electromagnetic field of the plurality of ambient atmosphere ions and/or auxiliary ionized species; a power source; a power storage; and power processing electronics, in accordance with the present invention.

MODES FOR CARRYING OUT THE INVENTION

Figure 2:
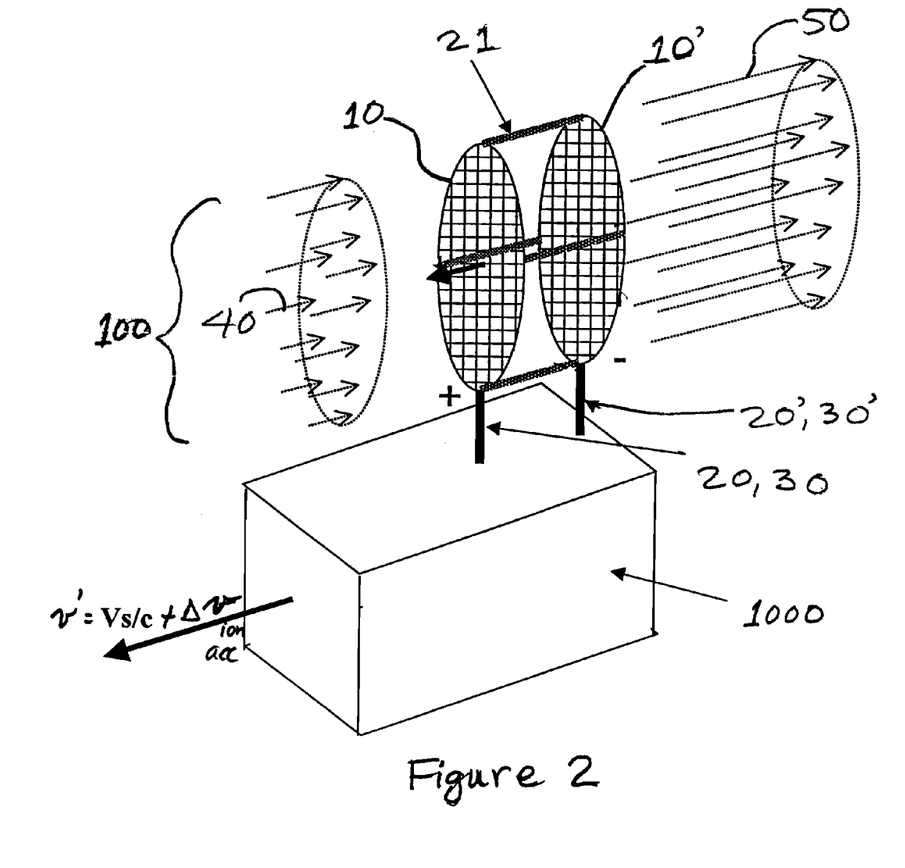
FIG. 2 is a perspective view of at least one ambient atmosphere ion thruster comprising at least one pair of permeable electrical members, the at least one thruster being mounted to a craft by at least one insulating support structure having at least one electrical feed (conduit), and ambient atmosphere constituents being intercepted by the at least one pair of permeable electrical members comprising an intake mass flux, and a reaction force being experienced by the craft from accelerated ions comprising an exhaust mass flux, in accordance with a first embodiment of the present invention.

FIG. 2 illustrates, in a perspective view, the AAIT system comprising at least one ambient atmosphere ion thruster 100 comprising at least one pair of permeable electrical members 10, 10', the at least one thruster 100 being mounted to a craft 1000 by at least one insulating support structure 20, 20' having at least one electrical feed (conduit) 30, 30', ambient atmosphere constituents being intercepted by the at least one pair of permeable electrical members 10, 10' and comprising an intake mass flux 40, and a reaction force, thrust T, being experienced by the craft 1000 from accelerated ions present within an exhaust mass flux 50, in accordance with a first embodiment of the present invention. The at least one pair of permeable electrical members 10, 10' may comprise at least one electrical component selected from a group consisting essentially of at least one pair of electrical grids and at least one pair of porous electromagnetic structures. Each member of the at least one pair of permeable electrical members 10, 10' may also be structurally connected, but not electrically connected, to one another by the at least one insulating support structure 21. The intake mass flux 40 may comprise predominant constituents such as He, $N_2$, $N^+$, O, and $O^+$ for operation of the present invention in the near-Earth space environment (also indicated in FIG. 9). While the at least one ambient atmosphere ion thruster 100 of FIG. 2 is shown in an outboard disposition, all possible inboard dispositions of the at least one ambient atmosphere ion thruster 100 are also hereby encompassed by the present invention.

Also in FIG. 2, the time derivatives of the intake mass flux' 40 momentum of all species is represented by the product expression $m_{dot} \times v_{s/c}$, wherein $m_{dot}$=the intercepted mass flow rate and $v_{s/c}$=velocity of the craft. The time derivative of the exhaust mass flux' 50 momentum is represented by the sum of the product expressions $m_{dot(ion)} \times (v_{s/c} + \Delta v_{ion\ acc}) + m_{dot(non-ion)} \times v_{s/c} = m_{dot(ion)} \times v' + m_{doc(non-ion)} \times v_{s/c}$, wherein $m_{dot(ion)}$=the accelerated ions mass flow rate and $m_{dot(non-ion)}$=the non-ionized mas flow rate, $v_{s/c}$=velocity of the craft, $\Delta v_{ion\ acc}$=the change in velocity of the accelerated ions, and $v' = v_{s/c} + \Delta v_{ion\ acc}$. The net thrust T being produced is equal to the difference between the time derivatives of the exhaust mass flux momentum and the intake mass flux momentum, wherein $T = m_{dot(ion)} \times \Delta v_{ion\ acc}$, in accordance with a first embodiment of the present invention. All naturally occurring non-ionized atmospheric constituents within the intake mass flux 40 that are not further ionized in the present invention throughput or by optional auxiliary equipment, such as auxiliary ionizers, will not be accelerated and will then exit the electrical member 10' with the same velocity, $v_{s/c}$, as such existing non-ionized atmospheric constituents already had upon entering the electrical member 10, thereby not contributing to the net thrust. Such "natural" mass flux may have an insignificant momentum exchange with the accelerated ions, due to their low density; however, they will still contribute some significant additional drag force as they impact the permeable electrical members 10, 10'.

Also referring to FIG. 2 and by example only, the present invention, as sized for a 1-m² electrical member operating at 500 V with a 0.2-m electrical member spacing at an altitude of 400 km above Earth's mean surface, may provide a thrust T in a range of approximately $2.0 \times 10^{-6}$ N to approximately $2.0 \times 10^{-4}$ N, wherein T=d/dt $(m \times v) = m_{dot(ion)} \times \Delta v_{ion\_acc}$. Thus, for T≃$2.0 \times 10^{-6}$ N, wherein $m_{dot(ion)} = 2.6 \times 10^{-8}$ g/s ($O^+$) to $8.9 \times 10^{-10}$ g/s ($N^+$), then $\Delta v_{ion\_acc} = 78$ km/s ($O^+$) to 83 km/s ($N^+$) based on no additional ionization; and for T≃$2.0 \times 10^{-4}$ N, and wherein $m_{dot(ion)} = 2.9 \times 10^{-6}$ g/s, then $\Delta v_{ion\_acc} = 59$ km/s ($N_2^+$) to 155 km/s ($He^+$) based on full auxiliary ionization of all incoming species, recognizing that relatively lighter ions, such as ($He^+$), are more rapidly accelerated than relatively heavier ions, such as $N_2^+$, in any given electric field.

The present invention may further comprise a thrust reverser 100' (not shown) achieved by reversing the relative polarity of each member of the at least one pair of permeable electrical members 10, 10'. In this manner, the ions in the intake mass flux 40 are decelerated instead of being accelerated, thereby providing a net thrust T' (not shown) in a direction opposite to the original thrust T direction (FIG. 2). Reversing the relative polarity of each member of the at least one pair of permeable electrical members 10, 10' may comprise reversing the polarity of the terminals of at least one power source 90 (shown in FIG. 11). Reversing the polarity of the terminals of the at least one power source 90 may also comprise mechanically actuating the at least one power source 90. The present invention may further comprise at least one gimbal (not shown) for the at least one pair of permeable electrical members 10, 10' and the typical craft appendage 60 (shown in FIG. 11) for further attitude control.

Figure 3:
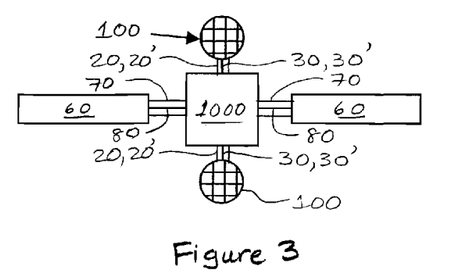
FIG. 3 is a rear view taken along a velocity vector of two ambient atmosphere ion thrusters, fixedly mounted to opposing sides of a craft for boost, deboost, and attitude control along a single axis, in accordance with a second embodiment of the present invention, with typical craft appendages, such as a solar array or radio frequency (RF) antenna being shown for reference only.

FIG. 3 illustrates, in a perspective view, a rear view taken along a velocity vector of two ambient atmosphere ion thrusters 100, fixedly mounted to opposing sides of a craft 1000 to orient an electric field for boosting, deboosting, and attitude-controlling the craft 1000 along a single axis, with typical craft appendages 60, such as a solar array or radio frequency (RF) antenna shown for reference only, the two thrusters 100 being mounted to the craft 1000 by at least one insulating support structure 20, 20' having at least one electrical feed (conduit) 30, 30', in accordance with a second embodiment of the present invention. While the two ambient atmosphere ion thrusters 100 of FIG. 3 are shown in an outboard disposition, all possible inboard dispositions of the two ambient atmosphere ion thrusters 100 are also hereby encompassed by the present invention.

Figure 4:
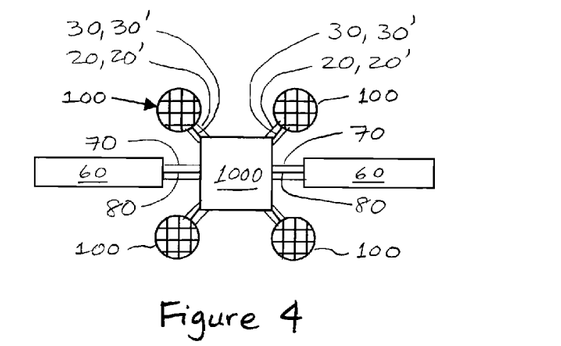
FIG. 4 is a rear view taken along a velocity vector of four ambient atmosphere ion thrusters, fixedly mounted to opposing vertices of a craft for boost, deboost, and attitude control along two axes, in accordance with a third embodiment of the present invention, with typical craft appendages, such as a solar array or radio frequency (RF) antenna being shown for reference only.

FIG. 4 illustrates, in a perspective view, a rear view taken along a velocity vector of four ambient atmosphere ion thrusters 100, fixedly mounted to opposing vertices of a craft 1000 to each orient an electric field for cooperatively boosting, deboosting, and attitude-controlling the craft 1000 along two axes, with typical craft appendages 60, such as a solar array or radio frequency (RF) antenna shown for reference only, the four thrusters 100 being mounted to the craft 1000 by at least one insulating support structure 20, 20' having at least one electrical feed (conduit) 30, 30', in accordance with a third embodiment of the present invention. While the four ambient atmosphere ion thrusters 100 of FIG. 4 are shown in an outboard disposition, all possible inboard dispositions of the four ambient atmosphere ion thrusters 100 are also hereby encompassed by the present invention.

Figure 5:
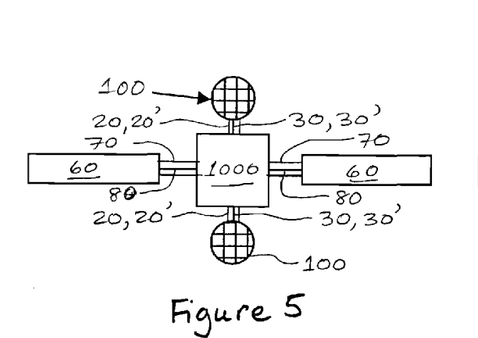
FIG. 5 is a rear view taken along a velocity vector of two ambient atmosphere ion thrusters, rotatably mounted to opposing sides of a craft for boost, deboost, and attitude control along two axes as well as for lateral thrust, in accordance with a fourth embodiment of the present invention, with typical craft appendages, such as a solar array or radio frequency (RF) antenna being shown for reference only.

FIG. 5 illustrates, in a perspective view, a rear view taken along a velocity vector of two ambient atmosphere ion thrusters 100, rotatably mounted to opposing sides of a craft 1000 to each orient an electric field for cooperatively boosting, deboosting, and attitude-controlling the craft 1000 along two axes as well as for laterally thrusting the craft 1000, with typical craft appendages 60, such as a solar array or radio frequency (RF) antenna shown for reference only, the two thrusters 100 being mounted to the craft 1000 by at least one insulating support structure 20, 20' having at least one electrical feed (conduit) 30, 30', in accordance with a fourth embodiment of the present invention. While the two ambient atmosphere ion thrusters 100 of FIG. 5 are shown in an outboard disposition, all possible inboard dispositions of the two ambient atmosphere ion thrusters 100 are also hereby encompassed by the present invention.

Figure 6:
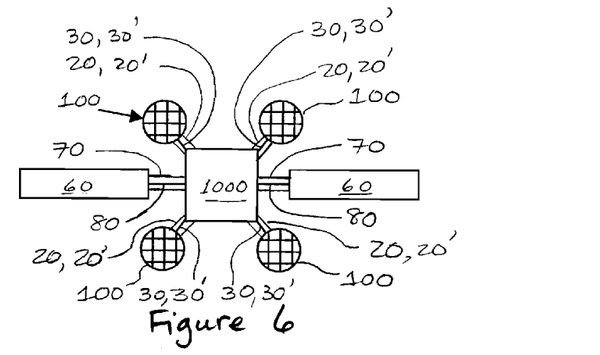
FIG. 6 is a rear view taken along a velocity vector of four ambient atmosphere ion thrusters, rotatably mounted to opposing vertices of a craft for boost, deboost, and attitude control along three axes as well as for lateral thrust, in accordance with a fifth embodiment of the present invention, with typical craft appendages, such as a solar array or radio frequency (RF) antenna, shown for reference only.

FIG. 6 illustrates, in a perspective view, a rear view taken along a velocity vector of four ambient atmosphere ion thrusters 100, rotatably mounted to opposing vertices of a craft 1000 to each orient an electric field for cooperatively boosting, deboosting, and attitude-controlling the craft 1000 along three axes as well as for laterally thrusting the craft 1000, with typical craft appendages 60, such as a solar array or radio frequency (RF) antenna shown for reference only, the four thrusters 100 being mounted to the craft 1000 by at least one insulating structure 20, 20' having at least one electrical feed (conduit) 30, 30', in accordance with a fifth embodiment of the present invention. While the four ambient atmosphere ion thrusters 100 of FIG. 6 are shown in an outboard disposition, all possible inboard dispositions of the four ambient atmosphere ion thrusters 100 are also hereby encompassed by the present invention.

Figure 7:
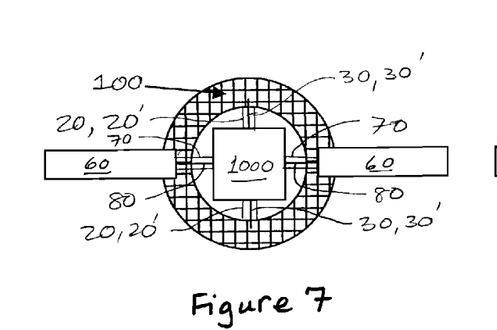
FIG. 7 is a rear view taken along a velocity vector of a single annular ambient atmosphere ion thruster, fixedly mounted to a craft for boost and deboost, in accordance with a sixth embodiment of the present invention, with typical craft appendages, such as a solar array or radio frequency (RF) antenna, shown for reference only.

FIG. 7 illustrates, in a perspective view, a rear view taken along a velocity vector of at least one annular ambient atmosphere ion thruster 100, fixedly mounted to a craft 1000 to each orient an electric field for cooperatively boosting and deboosting, with typical craft appendages 60, such as a solar array or radio frequency (RF) antenna, the at least one annular thruster 100 being mounted to the craft 1000 by at least one insulating support structure 20, 20' having at least one electrical feed (conduit) 30, 30', in accordance with a sixth embodiment of the present invention. While the at least one annular ambient atmosphere ion thruster 100 of FIG. 7 is shown in an outboard disposition, all possible inboard dispositions of the at least one annular ambient atmosphere ion thruster 100 are also hereby encompassed by the present invention.

Figure 8:
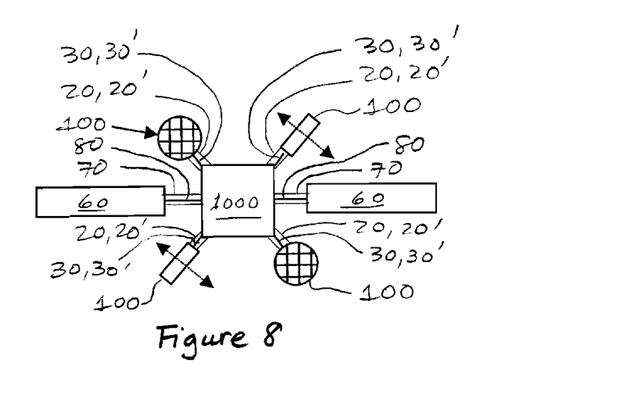
FIG. 8 is a rear view taken along a velocity vector of four ambient atmosphere ion thrusters, fixedly mounted to opposing vertices of a craft, wherein one opposing pair of thrusters is fixedly mounted in a plane perpendicular to the remaining opposing pair of thrusters, for boost, deboost, and attitude control along two axes as well as for lateral thrust, in accordance with a seventh embodiment of the present invention, with typical craft appendages, such as a solar array or radio frequency (RF) antenna, shown for reference only.

FIG. 8 illustrates, in a perspective view, a rear view taken along a velocity vector of four ambient atmosphere ion thrusters 100, fixedly mounted to a set of locations selected from a group consisting essentially of generally opposing vertices of a craft and generally opposing surfaces of the craft, wherein one opposing pair of thrusters 100 is fixedly mounted to the craft 1000 in a plane perpendicular to the remaining opposing pair of thrusters 100 to each orient an electric field for cooperatively boosting, deboosting, and attitude-controlling the craft 1000 along two axes as well as for laterally thrusting the craft 1000, with typical craft appendages 60, such as a solar array or radio frequency (RF) antenna shown for reference only, the four thrusters 100 being mounted to the craft 1000 by at least one insulating support structure 20, 20' having at least one electrical feed (conduit) 30, 30', in accordance with a seventh embodiment of the present invention. While the four ambient atmosphere ion thrusters 100 of FIG. 8 are shown in an outboard disposition, all possible inboard dispositions of the four ambient atmosphere ion thrusters 100 are also hereby encompassed by the present invention.

Figure 9:
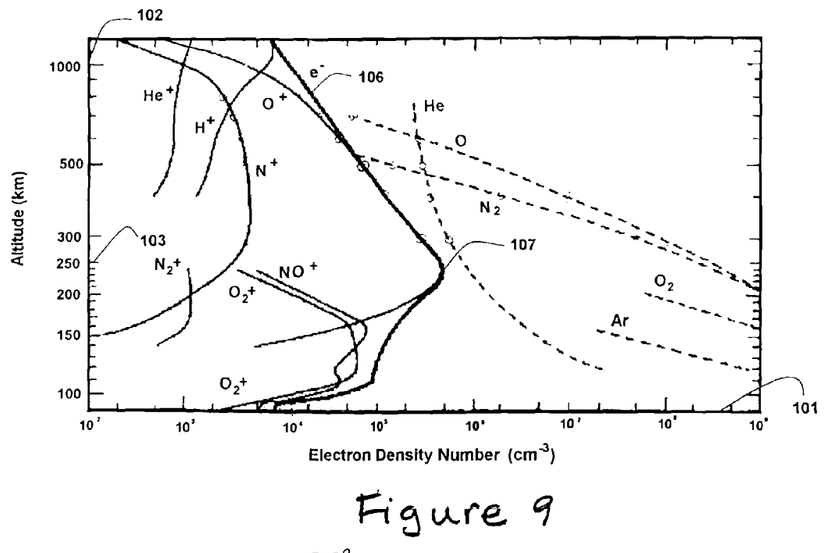
FIG. 9 is a graph of the nominal daylight composition, in terms of particles per cubic centimeter, of Earth's upper atmosphere, in terms of altitude, wherein variations of several orders of magnitude in composition of the various noted species are possible due to solar influences, the compositions and variations being important with respect to the present invention.

FIG. 9 illustrates, in a graphical representation, the nominal daylight composition, in terms of particle density (particles/cm³) along the abscissa axis 101, of Earth's upper atmosphere, in terms of altitude (km) along the ordinate axis 102, wherein variations of several orders of magnitude in composition of the various noted species are possible due to solar influences, the compositions and variations being important with respect to the present invention. FIG. 9 indicates the change in atmospheric composition as a function of altitude (i.e., from rarefied gases, primarily comprising O and $N_2$, occurring at lower altitudes, such as 250 km 103, to a mixture largely comprising positive ions $H^+$, $O^+$, $N^+$, and $He^+$ as well as free electrons 106 at higher altitudes 104, such as 1000 km). The positive ion composition, being influenced by ionizing radiation, typically peaks 107 at approximately 250 km during daylight in a "quiet" sun condition (i.e., a low solar storm, low sunspot number). At this altitude range, the frictional forces incident upon a craft 1000, such as a satellite, are substantial and are primarily caused by the presence of neutral O and $N_2$ species. The present invention may be used to nearly continuously counteract such frictional force (drag). While the composition of the upper atmosphere is generally electrically neutral, the atmospheric mass contains a minor level to a moderate level of positive ions which are accelerated by the present invention. The electrons within the intercepted mass flux, of course, are also accelerated in a direction opposite to the positive ion acceleration vector (e.g., in the craft velocity vector direction for the case of AAIT operation in a boost mode), thereby forming some counter-force, albeit negligible due to the substantially lower electron mass relative to any ion mass. Ionizing and consequently accelerating previously neutral atoms or molecules may be desirable at the lower altitude ranges, which is achieved by forming a photon or electromagnetic field of a magnitude sufficiently great to effect the ionization during the interception period of the ambient gas. Preferably, the altitude for operating the present invention under typical atmospheric conditions comprises a range of approximately 200 km to approximately 1000 km in LEO.

However, the preferable altitude range would vary as a function of the celestial body around which the craft would operate due to differences in atmospheric compositions, especially differences in ion concentrations relative to neutral species. For example, Mars, Venus, Jupiter, Saturn, and Europa are some of the celestial bodies within the solar system which are known to have sensible atmospheres. The present invention specifically involves operation without limitation as to the relative chemical composition of a given celestial body's atmosphere as long as the particle number density falls within a wide range of possible values. The present invention may also comprise using both the pre-existing ionized species and the further ionized species, such as the double-ionization of methane ($CH_4$). The present invention may also comprise using a naturally occurring heavy atomic species such as xenon (Xe) for increasing the reactive force.

Figure 10:
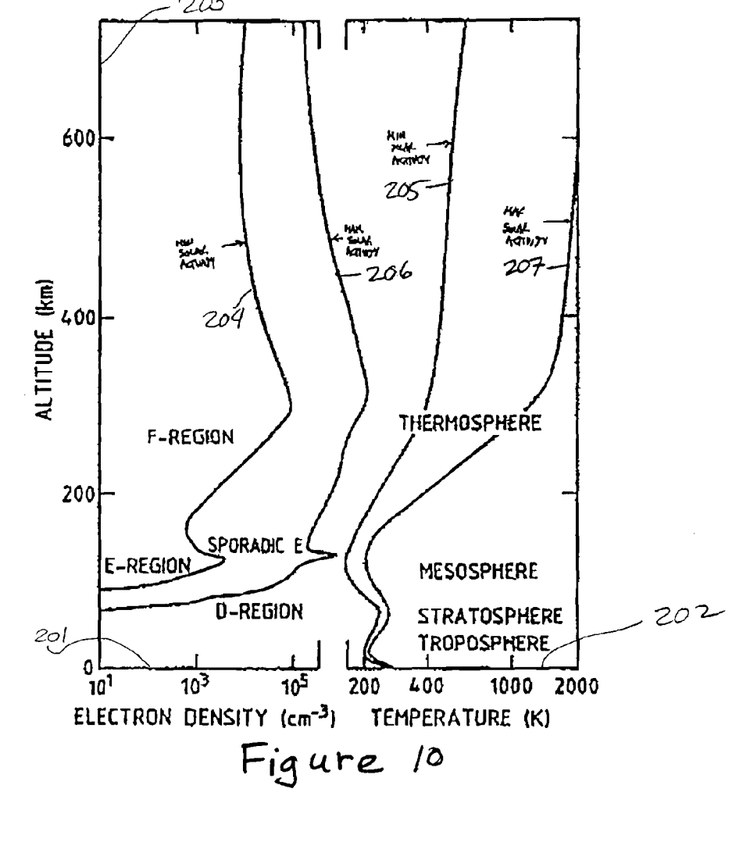
FIG. 10 is a graph of the typical variations in certain parameters, electron density and temperature, of Earth's upper atmosphere, in terms of altitude, ranging from minimum solar activity to maximum solar activity with respect to the present invention.

FIG. 10 illustrates, in a graphical representation, the typical variations in certain parameters, particle (especially electron) density (particles/cm³) 201 and temperature (K) 202 along the abscissa axis, of Earth's upper atmosphere, in terms of altitude (km) along the ordinate axis 203, ranging from minimum solar activity 204, 205 to maximum solar activity 206, 207, which is relevant to the present invention. Particle (electron) density is a consideration for operating the present invention since the atmosphere is generally electrically neutral and, as such, indicates the corresponding availability of positive ions. The thermal velocity of the ambient atmosphere constituents in the foregoing altitude range comprises a significant fraction of the orbital velocity, which is in a range of approximately 7.5 km/sec to approximately 7.7 km/sec, of a craft 1000, such as a satellite, in a near-circular orbit in the same altitude range. The particle densities (shown in FIG. 9) indicate that the ambient atmosphere flow, which is experienced by a craft 1000 in this altitude range, is in the free molecular flow regime. Returning to FIG. 2, in free molecular flow, the velocity of all naturally occurring ions is not be limited to a direction being strictly normal to any at least one pair of permeable electrical members 10, 10', but rather has thermally-induced velocity components in random directions superimposed on the relative flow direction which is opposite to that of $v_{s/c}$. As such, any at least one pair of permeable electrical members 10, 10' oriented even in a plane along a velocity vector will still intercept some ambient atmosphere constituents.

Figure 11:
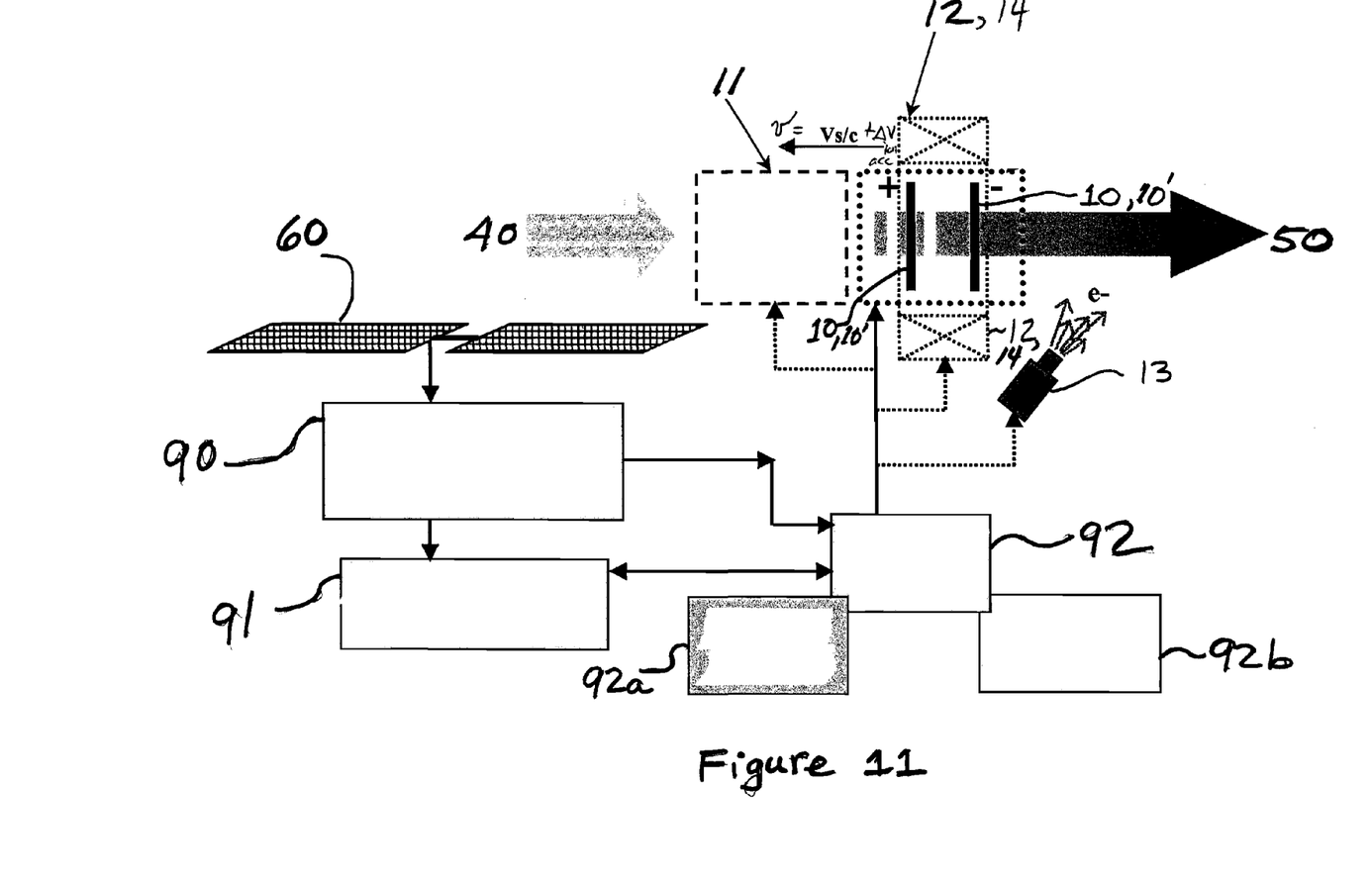

FIG. 11 illustrates, in a schematic view, an operational flowchart of an AAIT system, further comprising subsystems such as at least one auxiliary ionizing device 11 selected from a group consisting essentially of a synchrotron, an electron bombardment ionizer, a radio frequency ionizer, an x-ray ionizer, a microwave ionizer, an extreme ultraviolet (EUV) ionizer, a flash lamp ionizer, and a magnetic field ionizer for ionizing any un-ionized constituents in the ambient atmosphere and for ionizing double, triple, or higher-order ionization levels of already-ionized species, in accordance with the present invention. The present system may also further comprise at least one electromagnetic field modifying device selected from a group consisting essentially of an electron gun 13 for dissipating any charge acquired by the craft 1000, a permanent magnet 12 for modifying the electromagnetic field of the plurality of ambient atmosphere ions, and an electromagnetic field projector 14 for modifying the electromagnetic field of the plurality of ambient atmosphere ions, the at least one electromagnetic field modifying device being incorporated into the AAIT system for improving overall efficiency, for reducing wear, for reducing generated electromagnetic interference, and for otherwise providing proper operation of the system with respect to an operating craft.

The AAIT system may comprise a power source 90, fed by at least one ancillary equipment 61 comprising at least one power feed equipment selected from a group consisting essentially of solar cell array, a solar-thermal cell, solar-thermal collection generator (including, but not limited to, a Rankine power cycle, a Brayton power cycle, or a Sterling power cycle), a nuclear reactor, a laser collector, a microwave collector, and the like; a power storage 91, such as a battery, a rechargeable battery, a flywheel, a fusible salt, and the like; and power processing electronics 92, such as command interface electronics 92a (manual or automatic) and state-of-health instrumentation and telemetry 92b. While the at least one power feed equipment is illustrated as a solar cell, by example only, any source of electrical power is acceptable. The power source 90 may be "increment," in the case of solar power, or may be "received energy," necessitating the addition of the power storage device 91 during periods when the power source 90 is in the off-mode. The switching and power processing may be accomplished by the power processing electronics 92 which are controlled by either the manual or automatic command interface electronics 92a. The power processing electronics 92 further receive information from the state-of-health instrumentation and telemetry 92b. Power from the power processing electronics 92 is conveyed to the at least one pair of permeable electrical members 10, 10'. If desired, the ion flow may be shaped and formed by the at least one electromagnetic field modifying device (e.g., the permanent magnet 12 and the electromagnetic field projector 14). Finally, the at least one auxiliary ionizing device 11 may be disposed upstream of the forward permeable electric member 10 for ionizing incoming neutral particles. The at least one auxiliary ionizing device 11 may use EUV, RF, x-ray, or any other electromagnetic radiation for ionizing the neutral particles.

The present invention may be applicable to uses such as providing continuous drag make-up thrusting for large scale craft such as the ISS operating in an LEO environment. Assuming daylight and quiet sun conditions at 400 km, 10% overall power conversion efficiency, 500 V with a 0.2-m spacing between the permeable electrical members 10, 10', and full ionization of ambient atmosphere species, the each at least one permeable electrical member may comprise, by example only, a permeable area of approximately 270 m$^2$ with approximately 30 m$^2$ additional drag area which provides for operation at a 15% duty cycle (21.6 kW for the AAIT being in the "on" mode; 3.3 kW being the average load) or a permeable area of approximately 40 m$^2$ with approximately 4 m$^2$ additional drag area which provides for continuous operation (3.0 kW being the average load) for drag compensation. Assuming daylight and quiet sun conditions at 400 km, 10% overall power conversion efficiency, 500 V per 0.2 m, and no additional ionization of ambient atmosphere species, the each at least one permeable electrical member may comprise, by example only, a permeable area of approximately 4000/m$^2$ with approximately 30 m$^2$ additional drag area which provides for continuous operation (3.0 kW being the average load) for drag compensation.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, various changes and modifications in form, thruster material, and fabrication material detail that may be made without departing from the spirit and scope of the inventions as set forth in the appended claims should be readily apparent to those of ordinary skill in the art. No claim herein is to be construed under the provisions of 35 U.S.C. § 112, sixth paragraph, unless the element is expressly recited using the phrase "means for."

INDUSTRIAL APPLICABILITY

The present invention applies industrially to propulsion systems employing AAITs which include, but are not limited to, the following operations during those portions of orbital or free trajectory flight passing through the sensible atmosphere associated with any celestial body: drag compensation for a craft in LEO (e.g., in an altitude range of approximately 200 km to approximately 1000 km), and for craft orbiting other celestial bodies, thereby permitting continuous operation of the craft at low altitudes otherwise requiring either more or less continuous expenditure of on-board propellant; boost from a low altitude, near-circular orbit to an elliptical orbit having an extremely large apoapsis (e.g., apogee), even an apoapsis approaching an escape trajectory; deboost from a high energy approach trajectory or a high apoapsis elliptical orbit to a lower energy orbit, even an orbit approaching the limit of aerodynamic stability or the limit of permissible thermal heating; deboost/boost in a sequence that permits "atmospheric dipping" having an orbit periapsis (e.g., perigee) at an otherwise unstable altitude; deboost for providing a controlled terminal entry into the atmosphere; craft attitude control about at least one principle axis (i.e., pitch, yaw, and/or roll control); and orbital ephemeris maintenance (e.g., inclination, longitude of ascending node, semi-major axis, eccentricity, etc.).

What is claimed:

1. An ambient atmosphere ion thruster method for propelling a craft, said method comprising providing at least one ambient atmosphere ion thruster, the at least one ambient atmosphere ion thruster providing step comprising providing at least one pair of permeable electrical members, the at least one pair of permeable electrical members providing step comprising providing a forward permeable electrical member for receiving ambient atmosphere reaction mass and providing an aft permeable electrical member, the forward permeable electrical member providing step and the aft permeable electrical member providing step together comprising providing each member, having an opposing polarity in relation to one another, for accelerating a plurality of ambient atmosphere reaction mass ions, the at least one ambient atmosphere ion thruster being mounted to the craft for imparting reaction force thereto, said craft having no on-board supply of reaction mass and no lift force applied thereto, and at least one reaction force being imparted to the craft by accelerating the plurality of ambient atmosphere ions.

2. A method, as recited in claim 1, further comprising the step of providing at least one insulating support structure for mechanically connecting the at least one ambient atmosphere ion thruster to the craft, the at least one insulating support structure having at least one electrical feed for electrically connecting the at least one pair of permeable electrical members to an electrical power source.

3. A method, as recited in claim 1, wherein the step of providing the at least one pair of permeable electrical members comprises mechanically connecting each member of the at least one pair to one another, wherein the step of providing the at least one pair of permeable electrical members comprises providing a plurality of ambient atmosphere constituents, being intercepted by the at least one pair of permeable electrical members, comprising an intake mass flux, and wherein the step of providing the at least one pair of permeable electrical members comprises providing a plurality of accelerated ambient atmosphere ions, imparting the reaction force to the craft, comprising an exhaust mass flux.

4. A method, as recited in claim 1, wherein the step of providing the at least one ambient atmosphere ion thruster comprises providing two ambient atmosphere ion thrusters being fixedly mounted to opposing sides of the craft to each orient an electric field for cooperatively boosting, deboosting, and attitude-controlling the craft along a single axis.

5. A method, as recited in claim 1, wherein the step of providing the at least one ambient atmosphere ion thruster comprises providing four ambient atmosphere ion thrusters being fixedly mounted to opposing vertices of the craft to each orient an electric field for cooperatively boosting, deboosting, and attitude-controlling the craft along two axes.

6. A method, as recited in claim 1, wherein the step of providing the at least one ambient atmosphere ion thruster comprises providing two ambient atmosphere ion thrusters being rotatably mounted to opposing sides of the craft to each orient an electric field for cooperatively boosting, deboosting, and attitude-controlling the craft along two axes as well as for laterally thrusting the craft.

7. A method, as recited in claim 1, wherein the step of providing the at least one ambient atmosphere ion thruster comprises providing four ambient atmosphere ion thrusters being rotatably mounted to a set of locations selected from a group consisting essentially of generally opposing vertices of the craft and generally opposing surfaces of the craft to each orient an electric field for cooperatively boosting, deboosting, and attitude-controlling the craft along three axes as well as for laterally thrusting the craft.

8. A method, as recited in claim 1, wherein the step of providing the at least one ambient atmosphere ion thruster comprises providing a single annular ambient atmosphere ion thruster being fixedly mounted to the craft to orient an electric field for boosting and deboosting.

9. A method, as recited in claim 1,
wherein the step of providing the at least one ambient atmosphere ion thruster comprises providing four ambient atmosphere ion thrusters being fixedly mounted to a set of locations selected from a group consisting essentially of generally opposing vertices of the craft and generally opposing surfaces of the craft, and
wherein the step of providing the at least one ambient atmosphere ion thruster comprises providing one opposing pair of the four thrusters being fixedly mounted to the craft in a plane perpendicular to that of the remaining opposing pair of thrusters to each orient an electric field for cooperatively boosting, deboosting, and attitude-controlling the craft along two axes as well as for laterally thrusting the craft.

10. A method, as recited in claim 1, further comprising the step of providing at least one means for reversing the polarity of the at least one pair of permeable electrical members for reversing thrust.

11. A method, as recited in claim 1, wherein the at least one ambient atmosphere ion thruster providing step comprises operating the at least one ambient atmosphere ion thruster in a path selected from a group consisting essentially of an orbit proximal to any celestial body having a sensible atmosphere and in a free trajectory having a portion traversing a sensible atmosphere.

12. An ambient atmosphere ion thruster method for propelling a craft, said method comprising providing at least one ambient atmosphere ion thruster,
the at least one ambient atmosphere ion thruster providing step comprising providing at least one pair of permeable electrical members, the at least one pair of permeable electrical members providing step comprising providing a forward permeable electrical member for receiving ambient atmosphere reaction mass and providing an aft permeable electrical member, the forward permeable electrical member providing step and the aft permeable electrical member providing step together comprising providing each member, having an opposing polarity in relation to one another, for accelerating a plurality of ambient atmosphere reaction mass ions,
the at least one ambient atmosphere ion thruster being mounted to the craft for imparting reaction force thereto, said craft having no on-board supply of reaction mass and no lift force applied thereto,
at least one reaction force being imparted to the craft by accelerating the plurality of ambient atmosphere ions, and
further comprising the step of providing at least one auxiliary ionizing device selected from a group consisting essentially of an electron bombardment ionizer, a radio frequency ionizer, a microwave ionizer, an extreme ultraviolet ionizer, a flash lamp ionizer, and a magnetic field ionizer for ionizing any un-ionized constituents in the ambient atmosphere.

13. A method, as recited in claim 1, further comprising the step of providing at least one electromagnetic field modifying device selected from a group consisting essentially of a permanent magnet and an electromagnetic field projector for modifying the electromagnetic field of the plurality of ambient atmosphere ions.

14. A method, as recited in claim 12, further comprising the step of providing at least one electromagnetic field modifying device selected from a group consisting essentially of a permanent magnet and an electromagnetic field projector for modifying the electromagnetic field of the plurality of ambient atmosphere ions.

15. A method, as recited in claim 1, wherein the step of providing the at least one pair of permeable electrical members comprises providing at least one electrical component selected from a group consisting essentially of at least one pair of electrical grids and at least one pair of porous electromagnetic structures.

16. A method, as recited in claim 1, wherein the at least one ambient atmosphere ion thruster providing step comprises operating the at least one ambient atmosphere ion thruster in a low Earth orbit in a range of approximately 200 km to approximately 1000 km.

17. A method, as recited in claim 1, wherein the at least one ambient atmosphere ion thruster providing step comprises operating the at least one ambient atmosphere ion thruster in a low Earth orbit in a range of approximately 300 km to approximately 1000 km.

18. An ambient atmosphere ion thruster method for propelling a craft, said method comprising providing at least one ambient atmosphere ion thruster,
the at least one ambient atmosphere ion thruster providing step comprising providing at least one pair of permeable electrical members, the at least one pair of permeable electrical members providing step comprising providing a forward permeable electrical member for receiving ambient atmosphere reaction mass and providing an aft permeable electrical member, the forward permeable electrical member providing step and the aft permeable electrical member providing step together comprising providing each member, having an opposing polarity in relation to one another, for accelerating a plurality of ambient atmosphere reaction mass ions,
the at least one ambient atmosphere ion thruster being mounted to the craft for imparting reaction force thereto, said craft having no on-board supply of reaction mass and no lift force applied thereto, at least one reaction force being imparted to the craft by accelerating the plurality of ambient atmosphere ions, and further comprising the step of providing an electron gun for neutralizing any net operational charge buildup in the at least one thruster.

19. A method, as recited in claim 12, further comprising the step of providing an electron gun for neutralizing any net operational charge buildup in the at least one thruster.

20. A method, as recited in claim 1, wherein the at least one thruster providing step comprises mounting the at least one thruster to the craft in a disposition selected from a group consisting essentially of outboard and inboard.

21. An ambient atmosphere ion thruster method for propelling a craft, said method comprising providing at least one ambient atmosphere ion thruster, the at least one ambient atmosphere ion thruster providing step comprising providing at least one pair of permeable electrical members, the at least one pair of permeable electrical members providing step comprising providing a forward permeable electrical member for receiving ambient atmosphere reaction mass and providing an aft permeable electrical member, the forward permeable electrical member providing step and the aft permeable electrical member providing step together comprising providing each member, having an opposing polarity in relation to one another, for accelerating a plurality of ambient atmosphere reaction mass ions, the at least one ambient atmosphere ion thruster being mounted to the craft for imparting reaction force thereto, said craft having no on-board supply of reaction mass and no lift force applied thereto, at least one means for reversing the polarity of the at least one pair of permeable electrical members for reversing thrust, and at least one reaction force being imparted to the craft by accelerating the plurality of ambient atmosphere ions.

22. A method as recited in claim 1 or 21, wherein the ambient atmosphere reaction mass comprises at least one specie selected from the group consisting of hydrogen ($H_2$), nitrogen ($N_2$), oxygen ($O_2$) monatomic hydrogen (H), monatomic nitrogen (N), monatomic oxygen (O), helium (He), argon (Ar), methane ($CH_4$), xenon (Xe), ionized hydrogen atoms or molecules, ionized nitrogen atoms or molecules, ionized oxygen atoms or molecules, ionized helium, ionized argon, ionized methane and ionized xenon, any and all of which exist as a result of natural processes that are independent of the presence or operation of the at least one ambient atmosphere ion thruster.

* * * * *